United States Patent [19]
Schulz

[11] 3,758,867

[45] Sept. 11, 1973

[54] ANALOG VOLTAGE SELECTOR CIRCUIT WITH SELECTED VOLTAGE DETECTION

[75] Inventor: Raymond A. Schulz, Owego, N.Y.

[73] Assignee: The United States of America as represented by the Secretary of the Navy.

[22] Filed: Oct. 4, 1971

[21] Appl. No.: 188,681

[52] U.S. Cl. ............. 328/137, 307/235 R, 328/117, 328/147, 328/148, 328/154

[51] Int. Cl. ............................................. H03k 5/20

[58] Field of Search .................... 307/204, 219, 235, 307/235 A, 242, 243; 328/116, 117, 137, 147, 148, 149, 154

[56] References Cited

UNITED STATES PATENTS

| | | | |
|---|---|---|---|
| 3,609,565 | 9/1971 | Arnold | 328/154 X |
| 3,611,164 | 10/1971 | Day | 328/146 X |
| 3,550,016 | 12/1970 | Gugliotti | 307/243 X |
| 3,546,481 | 12/1970 | Talley | 307/235 |
| 3,593,285 | 12/1971 | Gillmann | 328/116 X |
| 3,083,305 | 3/1963 | Maley | 307/215 X |
| 3,596,107 | 7/1971 | Kittrell | 307/235 X |
| 3,609,397 | 9/1971 | Zaman | 328/137 X |
| 3,409,830 | 11/1968 | Phillips, Jr. | 328/147 X |
| 3,641,546 | 2/1972 | Blackburn | 328/148 X |
| 3,292,150 | 12/1966 | Wood | 340/149 |

OTHER PUBLICATIONS

Schulz, "Analog Signal Selector Circuits", IBM Tech. Discl. Bull. Vol. 13, No. 10, p. 2941–2943, 3/1971.

Clapper, "Network For Providing Comparison Hysteresis", IBM Tech. Discl. Bull.; Vol. 8, No. 4, p. 656–657, 9/1965.

*Primary Examiner*—John W. Huckert
*Assistant Examiner*—L. N. Anagnos
*Attorney*—Richard S. Sciascia, John W. Pease et al.

[57] ABSTRACT

Analog signal selecting circuitry has a plurality of parallel operational amplifiers connected to a common output, and comprises diodes and feedback resistances so arranged that all amplifiers except the one having the most positive or most negative input are isolated from the output. Digital detector circuitry is described for indicating which of the input signals is selected as most positive or most negative.

1 Claim, 2 Drawing Figures

ANALOG VOLTAGE SELECTOR CIRCUIT WITH SELECTED VOLTAGE DETECTION

BACKGROUND OF THE INVENTION

This invention relates to selector circuits and more particularly to such circuits which will provide an output signal having a potential which accurately equals the one analog signal which is, for example, the most negative among a plurality of analog input signals.

In analog computing, for example, as used in various aircraft applications, it is sometimes necessary to select either the most positive analog signal from several inputs, or the most negative analog signal from several inputs.

One example where this function is required occurs in synchro-to-digital converter systems where quadrant or octant selection must be done, or where analog circuits must determine which of two signals is the "reference" and which is the "signal". These functions are noted in greater detail in "Avionics Interface Systems Development", by G. G. Hodges and C. H. Crider, IBM document TR-68-280-032; Oct. 21, 1968.

Circuits for performing this function are shown in "Philbrick Applications Manual — Computing Amplifiers", Philbrick Researches Inc., page 56; June 1966. However, these circuits give rather crude results, since the selected analog signal is offset by the voltage drop across a series diode. This voltage drop is uncompensated, and uncertainties in the voltage drop will introduce significant errors.

SUMMARY OF THE INVENTION

With the foregoing in mind it is a principal object of this invention to provide a more accurate and reliable selector circuit.

It is another object of the invention to provide an improved selector circuit which is not subject to the diode voltage drop problem discussed earlier.

Yet another object is the provision, as an additional feature, of a novel selector circuit having the ability to detect which of the several input signals has been selected, and to supply an appropriate logic signal indicative thereof at standard logic level voltages.

The invention may be further said to reside in certain novel combinations and arrangements of elements by which the foregoing objects and advantages are achieved, as well as others which will become apparent from the following description of the preferred embodiments.

DESCRIPTION OF THE PREFERRED EMBODIMENTS

Figure 1:
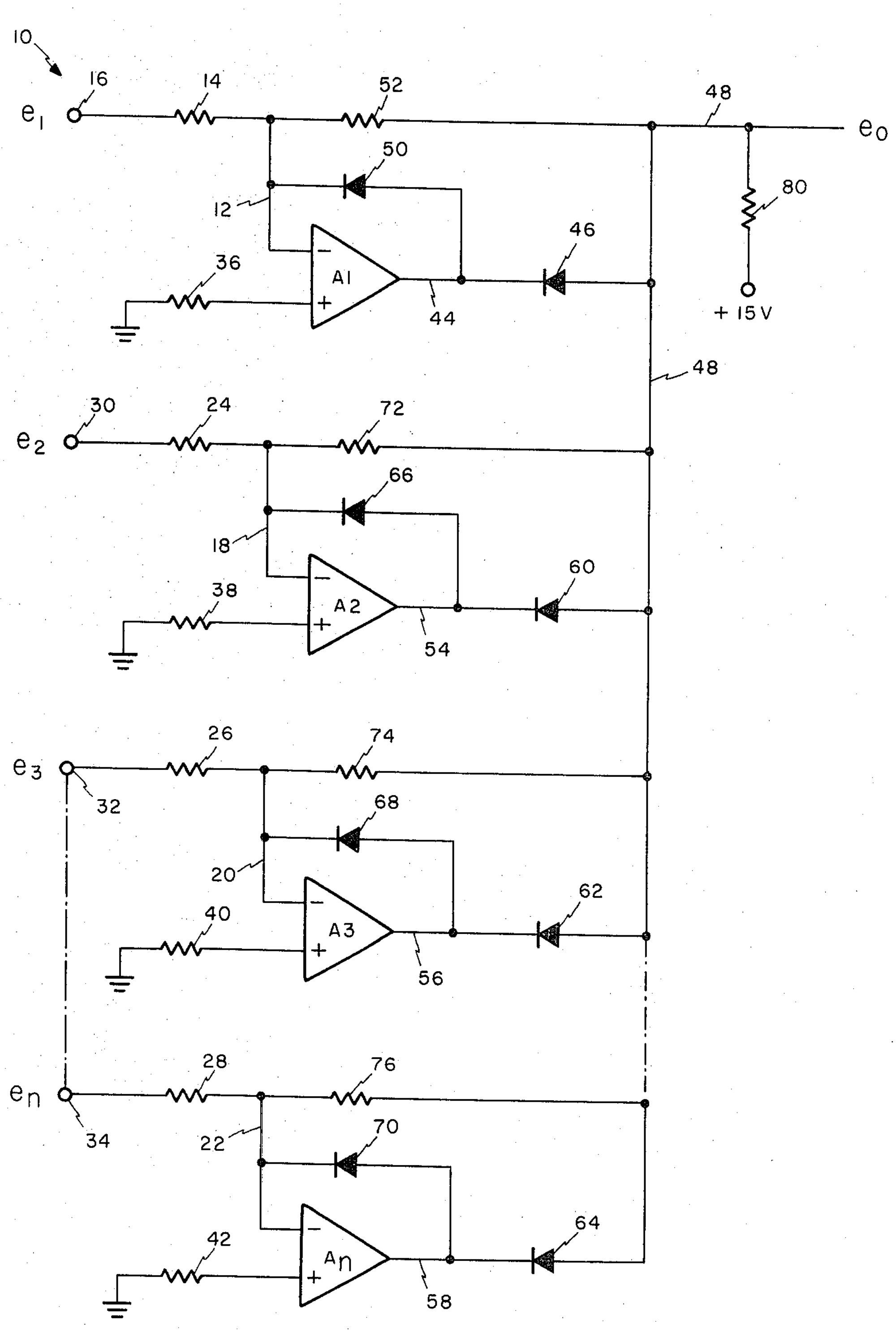
FIG. 1 is a diagrammatic illustration of a selector circuit embodying the invention.

In the form of the invention illustrated in FIG. 1 and described hereinafter, there is provided a selector circuit 10 which is adapted to provide as an output signal $e_0$ a voltage very closely approximating the most positive one of a plurality of analog voltage inputs $e_1$, $e_2$, $e_3$ - - - $e_n$.

The circuit 10 comprises a plurality of signal inverting operational amplifiers $A_1$, $A_2$, $A_3$ - - - $A_n$. The amplifier $A_1$ has its negative input terminal connected via line 12 and input resistor 14 to an input terminal 16 adapted to receive the analog input voltage $e_1$. Similarly, amplifiers $A_2$, $A_3$ and $A_n$ are connected via lines 18, 20, 22, and input resistors 24, 26, 28 to terminals 30, 32 and 34 to which analog voltages $e_2$, $e_3$, and $e_n$ are applied. The positive input connections of the amplifiers $A_1$, $A_2$, $A_3$, $A_n$ are connected to ground through respective resistors 36, 38, 40 and 42.

The output of the amplifier $A_1$ represented by line 44 is connected through a diode 46 to an output conductor or line 48 from which the output voltage $e_0$ of the circuit 10 is taken. A diode 50 is connected between the amplifier $A_1$ output line 44 and the input line 12, while a feedback resistor 52 is connected from the circuit output line 48 to the input line 12 of amplifier $A_1$.

Similarly, the amplifiers $A_2$, $A_3$ - - - $A_n$ have their outputs, represented by lines 54, 56, and 58 connected through diodes 60, 62, and 64 to the circuit output line 48, and diodes 66, 68, and 70 are connected from the respective output lines 54, 56, and 58 to the input lines 18, 20, and 22. Feedback resistors 72, 74, and 76 are connected between the circuit output line 48 and the amplifier input lines 18, 20, and 22, respectively.

The output line 48 is further connected through a bias resistor 80 to a source of bias voltage for a purpose which will presently be made apparent and which, in this example wherein the analog voltage inputs run typically from 0 to 10 volts, is a positive 15 volts.

In the operation of the circuit 10 assume, for example, that $e_2 > e_1, e_2 > e_3, \ldots e_2 > e_n$, that is $e_2$ is the most positive of all the $n$ analog voltages applied to the circuit. The circuit output line 48, it will be recognized, is in effect the summing point for each of the amplifiers $A_1$ - - - $A_n$. It will also be recognized that if amplifier $A_2$ were the only operational amplifier in the circuit, the output $e_0$ would equal $-e_2$. In accordance with the invention, the circuit 10 operates to effectively isolate from the circuit output all the amplifiers for which the input is less positive than the most positive input. Thus, prior to application of the inputs $e_1$ - - - $e_n$, the diodes 46, 60, 62 and 64 are all forward biased, and the diodes 50, 66, 68 and 70 are reverse biased. Now, in the present example where $e_2$ is the most positive input, the initial application of all $n$ inputs will result in a negative voltage $-e_2$ at line 48 which appears far too negative to all of the amplifiers except $A_2$ in that the signal being fed back via feedback resistors 52, 74, and 76 to their respective amplifiers $A_1$, $A_3$ - - - $A_n$ will cause these amplifiers to be driven as far positive as possible in an attempt to null the summing point. As the outputs of operational amplifiers $A_1$, $A_3$ - - - $A_n$ go positive, the diodes 46, 62, and 64 become reverse biased and all the amplifiers except the selected one $A_2$ are thereby isolated from the circuit output line 48 and the output signal $e_0$.

Very quickly, diodes 50, 68 - - - 70 become forward biased or turned on and the circuit 10 becomes balanced with the amplifiers $A_1$, $A_3$ - - - $A_n$ having their respective outputs on lines 44, 56 - - - 58 each settling at one diode voltage drop above ground. These diode drops, being across diodes 50, 68 - - - 70 have no effect on the output voltage $e_0$ due to the fact the feedback resistors 52, 74, 76 are positioned to be isolated from those diodes by the diodes 46, 62, 64.

The resistor 80 has been provided to insure that, even with an open circuit load, there will be enough current available to forward bias the selected amplifier's output diode, e.g., diode 60 in the foregoing example.

The invention also contemplates implementation as a circuit which will select the most negative of the inputs $e_1, e_2$ - - - $e_n$. In such an embodiment, the circuit is essentially the same as the circuit 10, but the polarities of all of the diodes are reversed, as well as the polarity of the bias voltage source connected to the biasing resistor 80. The operation of the most negative selecting circuit embodiment is the same as described above.

Figure 2:
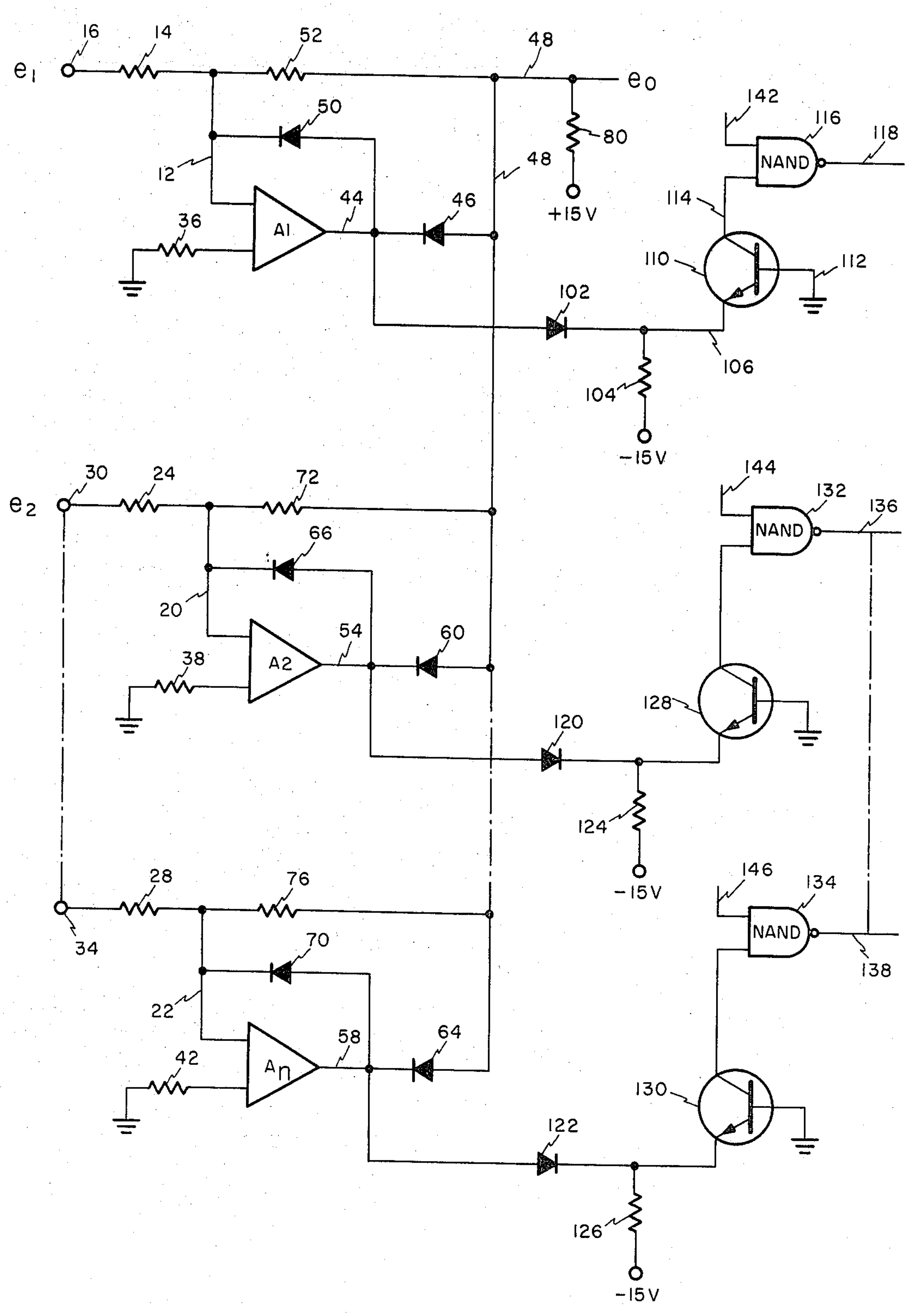
FIG. 2 is a diagrammatic illustration of another embodiment of the invention.

Referring now to FIG. 2, illustrating an embodiment of the invention including means for indicating which of the n inputs has been selected as most positive. In this Figure only so much of the circuit 10 is illustrated as is necessary to explain the invention, together with the additional detector circuitry.

In the FIG. 2 circuit there is provided for each of the amplifiers $A_1, A_2$ - - - $A_n$ an indicator circuit which provides a one output condition if the associated amplifier corresponds to the selected most positive of the input signals $e_1, e_2$, - - - $e_n$ or a different output condition if the associated amplifier does not so correspond. To this end, there is connected to the output line 44 of amplifier $A_1$ one side of a diode 102, the other side of which is connected through a resistance 104 to a source of bias voltage and through a line 106 to the emitter of a transistor 110. The base of the transistor is grounded as indicated by line 112, and the collector is connected as shown by line 114 as one input to a NAND gate 116, from which an indicating output may be taken on line 118.

Similarly, the other amplifiers $A_2$, - - - $A_n$ have their connected conncted to detector circuits respectively comprising diodes 120 and 122, bias resistors 124 and 126, transistors 128 and 130, and NAND gates 132 and 134 having output lines 136 and 138. The other inputs to the NAND gate means 116, 132, - - - 134, represented by lines 140, 142, - - - 144, and are constant or bias voltages as will be readily understood by those skilled in the arts to which the invention pertains.

Again assuming that $e_2$ is the most positive of the inputs, the output voltages of all of the amplifiers except $A_2$ will be at one diode voltage drop above ground. These outputs are, however, isolated from line 48 as mentioned before to eliminate the errors induced in prior art selector circuits. The selected amplifier $A_2$, however, will have an output on line 54 which is typically something between zero and −10 volts (where −10 is the full scale of operation of the circuit).

Now, taking the detection circuit associated with the non-selected amplifier $A_1$ as an example, the diode 102 will be forward biased by the voltage difference between the bias resistor 104 and the amplifier output on line 44. The conductivity of the diode 102 will permit sufficient current flow through the resistor 104 to make the line 106 sufficiently less negative to drive the transistor 110 to a non-conductive state. The result is a logical zero at the output line 118 indicating that the input $e_1$ was not selected as the most positive. The same will be true of the detector circuits associated with the other non-selected amplifiers $A_3$ - - - $A_n$.

Taking now the case of the detector circuit associated with the amplifier $A_2$, the relatively more negative condition of line 54 will cause the diode 120 to be reverse biased, resulting in less drop across resistor 124. This will drive the transistor 128 to saturation, and effect a logical one at the output line 136, thereby indicating that the input $e_2$ is the one which is the most positive of the inputs.

Of course, when the polarities of the diodes, and of the bias on resistor 80, are reversed to provide a circuit which selects the most negative of a plurality of inputs, the polarities of the diodes 102, 120, - - - 122 must be reversed, together with reversal of the bias polarity on resistors 104, 124, - - - 126, and interchange the connections of the base and emitter electrodes of each transistor, i.e. transistors 110, 128 . . . 130.

From the foregoing description it will be appreciated that the present invention has provided improved selector circuitry which not only provides an output which more accurately equals the selected most positive or most negative input, but also which provides a digital output indicative or representative of exactly which input was selected.

Obviously many modifications and variations of the present invention are possible in the light of the above teachings. It is therefore to be understood that within the scope of the appended claims the invention may be practiced otherwise than as specifically described.

What is claimed is:

1. A selector circuit for providing an output signal having a voltage accurately numerically equalling the one analog voltage input signal having the greatest voltage of a given polarity among a plurality of analog voltage input signals, said circuit comprising:

a plurality of operational amplifiers each having an inverting input connection and an output connection;

a plurality of input resistors for receiving said input signals and each connected to a respective one of said input connections;

a biasing resistor connected between a circuit output conductor and a source of biasing voltage;

a plurality of first diodes each connected between said circuit output conductor and a respective one of said amplifier output connections;

a plurality of feedback resistors each connected between said circuit output conductor and the input connection of a respective one of said amplifiers;

said first diodes each being oriented so as to be forward biased and thus to connect the respective amplifier output to said circuit output conductor and to permit feedback via the associated feedback resistor to said input connection only as long as the output voltage of the respective amplifier exceeds the voltage of said circuit output conductor, and to become reverse biased when the output voltage of the respective amplifier is less than that of the output conductor whereby only the first diode associated with said amplifier having the greatest input potential remains forward biased to provide output to said circuit output conductor;

a plurality of second diodes each connected between a respective one of said amplifer output connections and the input connection for the same amplifier;

said second diodes each being oriented so as to normally be reverse biased but to become forward biased in response to reverse biasing of the corresponding one of said first diodes, whereby direct feedback is effected for all of said amplifiers but the one associated with said greatest analog voltage input signal so that the output connection of each of said amplifiers having such direct feedback settles to one diode voltage drop above nominal ground;

a plurality of detector circuits each associated with the output connection of one of said amplifiers;

said detector circuits each being responsive to voltage changes at the output connection of the corresponding amplifier so as to provide a first output condition when the corresponding first diode is forward biased and a second output condition when said corresponding first diode is reverse biased, whereby said output conditions of said detector circuits are representative of which of said analog input voltages is the greatest;

a grounded base transistor;

digital signal output means connected to the transistor for providing said first output condition when said transistor is substantially saturated and said second output condition when said transistor is non-conductive, a third diode having an anode connected to said output connection of the associated amplifier and having a cathode connected to the emitter of said transistor;

a second biasing resistor connected from between said diode and said transistor to a source of biasing voltage;

said third diode and transistor being oriented so that said third diode is forward biased and said transistor is non-conductive when the first diode connected to the associated amplifier is reverse biased, and said third diode is reverse biased and said transistor is saturated when said first diode connected to the associated amplifier is forward biased;

said digital signal output means comprises NAND gate means biased to serve as a signal inverter and having one input connected to the collector of said transistor.

* * * * *